United States Patent [19]
Katsutoshi et al.

[11] 4,438,172
[45] Mar. 20, 1984

[54] HEAT RETAINING SHEET

[75] Inventors: Ando Katsutoshi; Nishiura Eiichi, both of Otsu, Japan

[73] Assignee: Toray Industries, Inc., Tokyo, Japan

[21] Appl. No.: 354,097

[22] PCT Filed: May 27, 1981

[86] PCT No.: PCT/JP81/00115
§ 371 Date: Jan. 27, 1982
§ 102(e) Date: Jan. 27, 1982

[87] PCT Pub. No.: WO81/03503
PCT Pub. Date: Dec. 10, 1981

[30] Foreign Application Priority Data

May 28, 1980 [JP] Japan ............................ 55-72516
Dec. 2, 1980 [JP] Japan ........................... 55-169176

[51] Int. Cl.³ ........................ B32B 27/02; B32B 27/36
[52] U.S. Cl. ................................... 428/220; 428/198;
428/221; 428/233; 428/234; 428/246; 428/253;
428/280; 428/282; 428/284; 428/287; 428/288;
428/296; 428/298; 428/300; 428/303; 428/373;
428/395; 428/480; 428/903

[58] Field of Search ............ 428/221, 233, 246, 253,
428/280, 282, 286, 288, 296, 298, 303, 360, 920,
921, 903, 373, 374, 480, 220, 198, 234, 284, 287,
395, 300

[56] References Cited
U.S. PATENT DOCUMENTS

| | | | |
|---|---|---|---|
| 3,837,022 | 9/1974 | Moore | 5/355 |
| 3,905,057 | 9/1975 | Willis et al. | 5/337 |
| 3,906,130 | 9/1975 | Tsurumi et al. | 428/131 |
| 4,146,674 | 3/1979 | Salamon et al. | 428/361 |
| 4,172,174 | 10/1979 | Takagi | 428/288 |
| 4,217,387 | 8/1980 | Viezee et al. | 428/288 |
| 4,320,166 | 3/1982 | Endo et al. | 428/288 |

Primary Examiner—James J. Bell
Attorney, Agent, or Firm—Austin R. Miller

[57] ABSTRACT

This invention relates to a heat retaining sheet comprising at least a web in which fibers containing polybutylene terephthalate as at least one of their components and having a substantially undrawn definite fiber length are mutually bonded, and which has small area shrinkage in boiling water. The present invention provides a heat retaining web which is particularly useful as the heat retaining material for batting or interlining for clothing, gloves, hats, bedclothes and so forth.

32 Claims, 8 Drawing Figures

HEAT RETAINING SHEET

FIELD OF THE INVENTION

This invention relates to a heat retaining sheet and more particularly, to a heat retaining sheet useful as a heat retaining material for batting or interlining in clothing, gloves, hats, bedblothes and the like.

BACKGROUND OF THE INVENTION

As heat retaining sheets, batting and quilted materials formed by sewing the batting with fabric having conventionally been known. To improve the heat retaining properties of clothes by the use of heat retaining webs, it has been necessary to increase the thickness of the heat retaining sheet or to increase its apparent density at the sacrifice of the drapability and functionality of the clothes when the clothes are worn, resulting in an unattractive appearance of the clothes. Hence, the application of the heat retaining sheet has been limited to clothes for use in cold weather such as ski wear.

To solve this problem, Japanese Patent Laid-Open No. 41577/1978, for example, proposes a web of undrawn micro-fibers formed by melt-blowing polyethylene terephthalate, polyamide or polypropylene. However, the non-woven web consisting of polyethylene terephthalate exhibits large area shrinkage in boiling water, generally scoring a value of at least 60%. When the heat retaining material is worn for an extended period or is washed repeatedly, problems such as creasing and breakage of yarns are likely to occur due to the difference in shrinkage between the web and various woven or knitted fabrics attached to the surface thereof. In the case of the non-woven web of fibers consisting of polyamide, recovery of compressive elasticity is generally 50% or less and bending rigidity is poor. In addition, it has poor washability because shrinkage during washing is as large as 10%. On the other hand, non-woven fabric consisting of a low heat-resistant polymer such as polypropylene undergoes shrinkage or is fused with the resulting lowered elastic recovery when subjected to various operations for clothes, such as pressing. If exposed to a high temperature environment for an extended period, for example, at 150° C. for 1.5 hour, the web suffers from a critical drawback in that autogenous ignition occurs.

On the other hand, as an attempt to impart stretchability to the non-woven web, it has been known to employ an elastic adhesive or fiber.

When an elastic adhesive is used, however, adhesion between the web and the adhesive is not sufficient and surface destruction occurs when the web is stressed. Also a sufficient stretch recovery properties can not be obtained.

As a method for using elastic fibers, Japanese Patent Laid-Open No. 16910/1980 discloses a method wherein an elastic film containing a foaming agent is expanded and then stretched to obtain a web having a reticular non-woven structure. Since, however, the fiber structure of this reticular web is formed by stretching after expansion, the fiber structure is strongly bundled in the stretching direction and since the size of the fibers is great and the fibers are not sufficiently separated and independent, flexibility is insufficient.

SUMMARY OF THE INVENTION

It is an object of the present invention to provide a thin heat retaining sheet which is devoid of the above-mentioned problems, maintains essentially the feel, appearance and other properties of the base materials, insures functionality of clothes when worn and provides excellent heat retaining properties.

It is another object of the present invention to provide a heat retaining sheet for industrial use having excellent durability and heat retaining properties.

It is still another object of the present invention to provide a heat retaining sheet which neither exhibits creases nor deforms but can be cleaned by dry cleaning and laundering and is free from inflammability.

It is still another object of the present invention to provide an elastic sheet which has a high heat retaining properties, is very soft and flexible and has an especially high stretch recovery ratio.

These objects of the present invention can be accomplished by a heat retaining web consisting of webs in which fibers containing polybutylene terephthalate as at least one of the components and having a substantially unstretched definite fiber length are mutually bonded, and which have area shrinkage when treated with boiling water of up to about 20%.

DESCRIPTION OF THE PREFERRED EMBODIMENTS Of THE INVENTION

Hereinafter, the heat retaining sheet of the present invention will be described in detail.

The heat retaining sheet of the present invention consists of at least a web in which fibers containing polybutylene terephthalate as at least a part of the fiber-forming components and having a substantially definite fiber length are mutually bonded, and which have area shrinkage in boiling water of up to about 20%.

Namely, the web forming the heat retaining sheet of the present invention is composed of fibers of a definite length consisting of non-continuous filaments and containing polybutylene terephthalate as at least one of the fiber-forming components. The fibers consist of unstretched yarns but not of stretched yarns, whereby the unstretched yarns are independent of, and separated from, one another without forming bundles, and are laminated while being kept sufficiently opened, thus forming thin layers. These thin layers are in turn layered like scales, thereby forming the non-woven web. The points of contact between the constituent fibers are melt-adhered and entangled by the fibers by themselves.

In order to obtain a heat retaining web having high heat retaining property, and being excellent in dimensional or shape stability and soft and rich in draping properties in accordance with the present invention, it is important to use, as the fiber raw material, polybutylene terephthalate or a copolymer type polybutylene terephthalate obtained by copolymerizing polybutylene terephthalate with small amounts of comonomers such as isophthalic acid, adipic acid, phthalic acid or sebacic acid, and to keep the area shrinkage of the web in boiling water at about 20% or below.

In the heat retaining web of the present invention, it is preferred that the area shrinkage of the web in boiling water be below about 20%, the average fineness of the web-forming fibers be up to 15 d and the fineness distribution be within the range of 0.001 to 40 d. If the average fineness is 15 d or below, there can be obtained a heat retaining web having sufficiently high heat retaining properties and high wash resistance. To obtain a heat retaining web which is thin and yet has high heat retaining properties, the average fineness is as low as possible and up to about 0.5 and preferably from 0.03 to 0.5 d, and the fineness distribution is from 0.01 to 1 d. To obtain good wash resistance, it is advisable to set the average size at a considerably large value. The fineness condition is preferably selected in accordance with the intended application or object.

In addition to the requirements for the predetermined area shrinkage in boiling water treatment and the fineness requirements, the heat retaining web according to the present invention preferably satisfies the requirement that the web has an apparent density of up to about 0.1 g/cm$^3$, preferably, from 0.01 to 0.1 g/cm$^3$. If these conditions are satisfied, there can be obtained a heat retaining web having a thermal insulation value of as high as at least 1.8 clo/cm.

The heat retaining web of the present invention has heat retaining properties per web thickness which are by about twice higher than that of the conventional polyester cotton, resin cotton using polyester or feather and by at least 1.4 times higher than that of conventional cotton using polyester hollow yarns having relatively high heat retaining properties among the prior art articles.

Since the heat retaining web of the present invention has extremely high heat retaining properties though it is thin, it shows sufficient heat retaining properties even when it is 0.5 to 30 mm thick and, preferably, from 0.5 to 7 mm thick.

The webs forming the heat retaining sheet may be composed of mixed webs having mutually different average fineness and fineness distributions within the range that satisfies the fineness condition of the present invention. For example, a heat retaining web having excellent recovery of compressive elasticity and wash resistance can be obtained by forming the webs by use of mixed fibers consisting of micro-fibers of a fineness of up to 0.5 d and thick fibers of a fineness of at least 7 d.

Fibers that constitute the webs may be bonded by a third component binder such as a low melting polymer in accordance with the intended application of the webs insofar as the softness of the webs is not lost.

Figure 1:
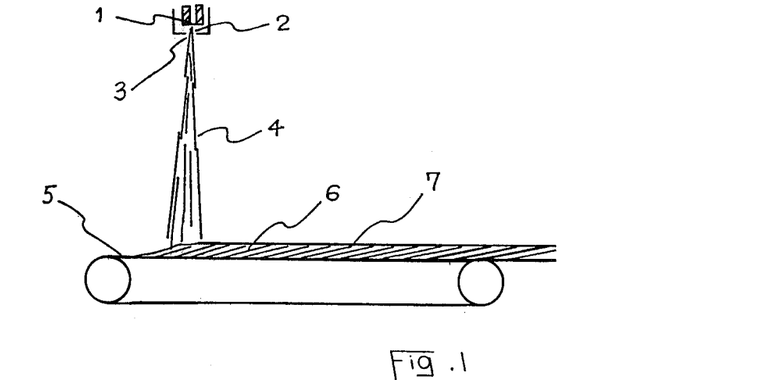
FIG. 1 is a schematic view showing an example of the production method of the heat retaining web in accordance with the present invention.

In producing the non-woven web of the present invention, it is necessary that the fibers forming the non-woven web be undrawn yarns. Accordingly, it is advantageous to employ a so-called "melt blow method" such as disclosed in Japanese Patent Publication No. 22525/1969 in order to produce the non-woven web of the present invention. FIG. 1 is a sectional view showing stepwise the outline of the melt blow production method. A molten polymer stream fed from a polymer charging port 1 of a spinning machine is joined together with a pressurized gas stream at a joining zone 2, is jetted from an orifice 3, and is then cooled to provide undrawn fiber yarns 4. When jetted while being accompanied by the gas stream, the undrawn fiber yarns are mutually separated and become independent and are joined together at their mutual contact points when cooled. Before they are perfectly solidified, they are periodically collected on a conveyor 5 to form thin layers 6. These thin layers 6 are layered like scales to provide the non-woven web 7.

In producing the non-woven web, it is especially preferred to adjust the variance of weight per unit area of the web, for example, the variance of weight per square meter for a 5 cm square web, to 5 to 25% in terms of a coefficient of valuation.

Figure 2:
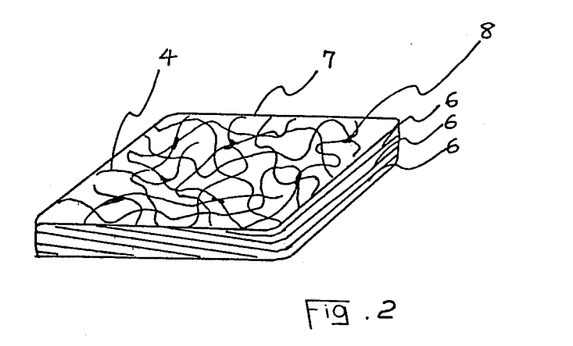
FIGS. 2 and 3 are schematic perspective view and schematic partially enlarged sectional view, each showing an example of the heat retaining web in accordance with the present invention.
Figure 3:
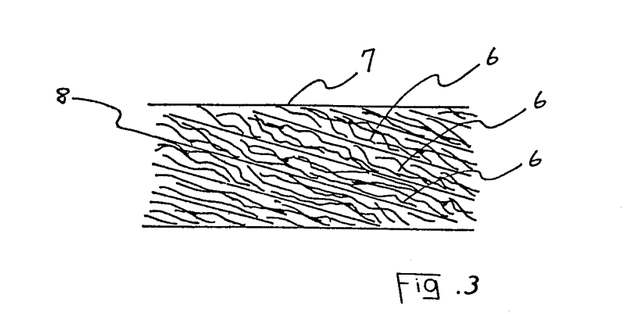
Figure 4:
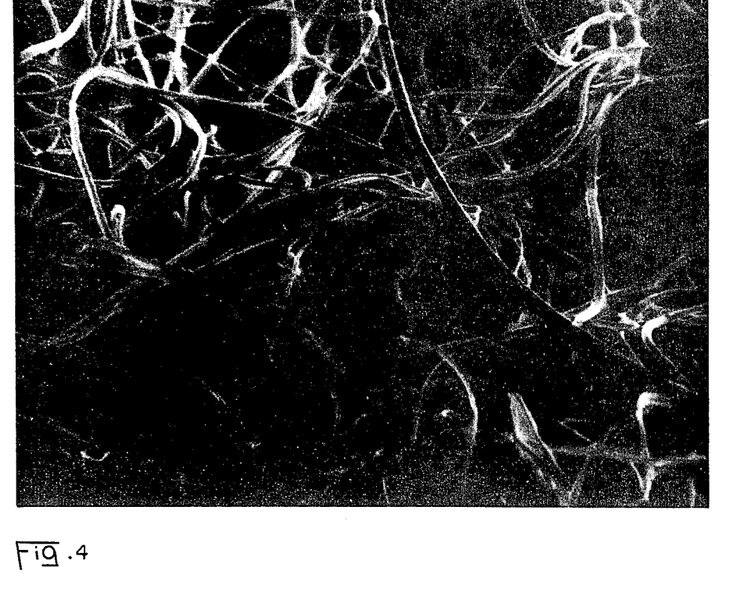
FIGS. 4 and 5 are scanning electron micrographs, each showing the surface condition of the heat retaining web of the present invention.
Figure 5:
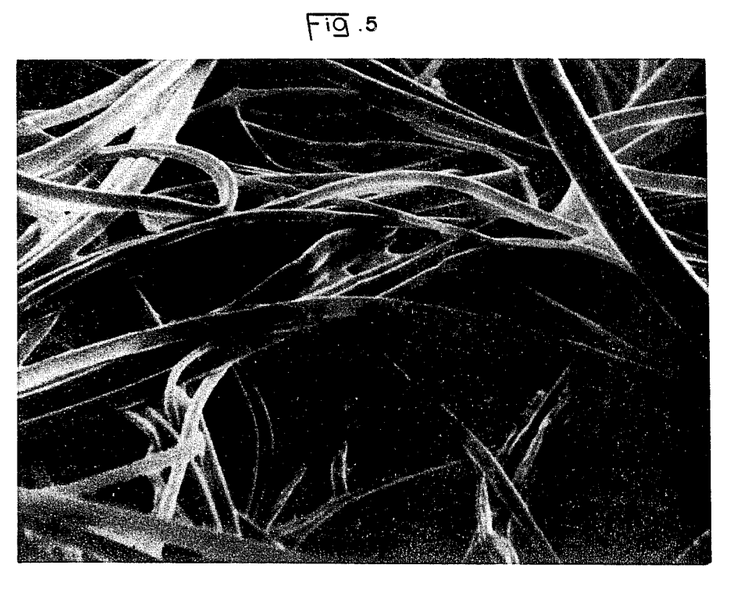

FIG. 2 is a perspective view showing an example of the resulting non-woven web and FIG. 3 is its partial enlarged sectional view. While sufficiently independent of and separate from one another, the undrawn fibers 4 entangle with one another and are joined together at the points of contact 8, thereby forming the thin layers 6. It can be seen that these layers are obliquely deviated from one another, are mutually laminated like scales and form the non-woven web 7. FIGS. 4 and 5 are scanning electron micrographs showing the surface condition of the resulting non-woven webs, respectively, at a magnification of 400X and 1100X. As is obvious from these micrographs, the fibers forming the non-woven web have a definite fiber length and are mutually melt-adhered and entangled. Since the present invention uses particularly polybutylene terephthalate, the spinning temperature can be set at as high as 300° C. because the melting point of the polybutylene terephthalate is 224° C. In comparison with polyethylene terephthalate, therefore, melt-adhesion between the fibers is easier and the shape and dimensional stability of the web can be improved.

Figure 6:
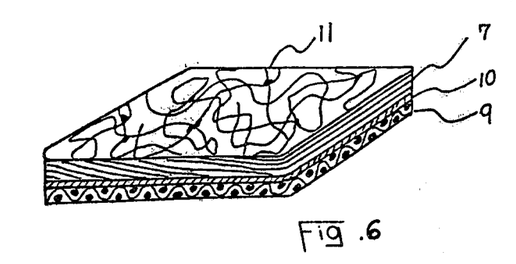
FIG. 6 is a schematic perspective view showing another example of the heat retaining web of the present invention.

When the aforementioned fiber materials, fineness, apparent density, area shrinkage and thermal insulation value are all satisfied, the non-woven web in accordance with the present invention exhibits extremely excellent flexibility and heat retaining property, but it is necessary that the fibers are locally joined so as to leave sufficient gaps between them. The web having such a structure and satisfying the abovementioned various requirements may be formed by integrating a knitted or woven fabric or a heretofore known thin non-woven fabric on one or both surfaces of a non-woven web, as depicted in FIG. 6. By laminating other web-like materials, there can be obtained a heat retaining web having a thermal insulation value of 2.0 to 10.0 clo/cm, improving the heat retaining effect and dimensional stability. In FIG. 6, reference numerals 9, 10 and 11 represent the knitted fabric, an adhesive layer and a composite web formed by integrally laminating the non-woven web 5 with the knitted fabric 9, respectively.

The other web-like materials to be laminated on the non-woven web are preferably 0.05 to 1 mm thick and have sufficient flexibility in the laminated state and the minimal possible area shrinkage in boiling water.

It is of course possible to use flame-retarding webs such as aluminum foil as the abovementioned web-like materials.

It is also possible to change the various properties of the non-woven web of the present invention such as hygroscopicity, bulkiness, anti-static properties, hand and the like by blending various known fibers as the constituent fiber materials in accordance with the intended application while maintaining the heat retaining properties and flexibility of the non-woven web of the invention.

Figure 7:
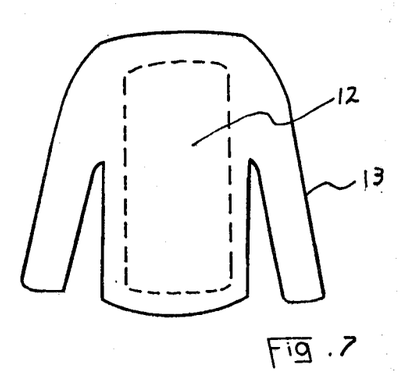
FIGS. 7 and 8 are schematic plan views, each showing an example of clothes using the heat retaining web of the present invention.
Figure 8:
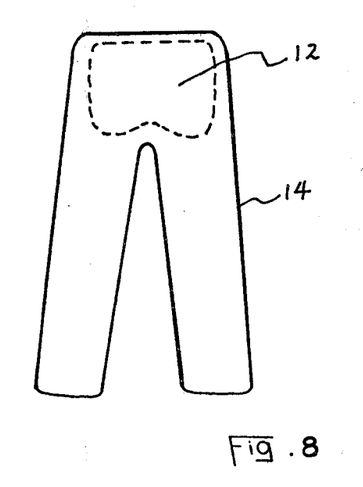

FIGS. 7 and 8 are plan views, each showing an example of clothes using the heat retaining web of the present invention. Reference numeral 12 represents the portion at which the heat retaining web of the invention is disposed, and reference numerals 13 and 14 represent coat and pants, respectively. As depicted in the drawings, the heat retaining web of the present invention can be adapted to that portion which requires the heat retention because it has not only excellent heat retaining properties but also excellent drapability. It provides excellent heat retaining and energy-saving effects and an appreciable silhouette.

Next, an elastic heat retaining sheet of the present invention, which is soft and rich in flexibility and has an especially high stretch recovery ratio, will be described.

The elastic heat retaining sheet can be accomplished by a non-woven web which is formed by first arranging those elastic fibers independent of, and separate from, one another which consist of a polyether ester type copolymer containing at least polybutylene terephthalate as a hard segment and having a substantially undrawn definite fiber length, thereby forming thin fiber layers in which mutual contact points of these fibers are joined together by the polyether ester type copolymer per se of the elastomer forming the fibers, and then laminating these thin fibers, whereby the non-woven web has area shrinkage in boiling water of up to about 20% and a stretch recovery ratio of at least 50% when stretched by 20%.

Preferred examples of the polyether ester forming the elastic non-woven web are elastomers consisting of terephthalic acid, 1,4-butanediol, dicarboxylic acids other than terephthalic acid and/or low-molecular diols other than 1,4-butanediol and poly(alkylene oxide)glycol having a number-average molecular weight of about 300 to about 6,000.

In other words, it is an essential requirement that the non-woven web having area shrinkage in boiling water of up to about 20% and the stretch recovery ratio of at least 50% when stretched by 20%, as stipulated in the present invention, consists of undrawn fiber filaments composed of the abovementioned polyether ester type elastomer and having a definite fiber length. Only when the non-woven web is formed by the undrawn fiber filaments consisting of the abovementioned polyether ester type elastomer, can there be obtained a non-woven web having the area shrinkage in boiling water of up to 20% and exhibiting the stretch recovery ratio of at least 50% when stretched by 20%. Even if the fiber consists of the polyether ester type elastomer, the polyether units as the elastic segment of the elastomer would be crystallized when stretched, and this crystallization would lower the elastic recovery of the resulting non-woven web. Hence, crystallization of the polyether segment must be avoided. The term "undrawn fibers" used herein preferably refers to undrawn fiber filaments obtained by the spinning means such as shown in FIG. 1, but those filaments may also be used which are not perfectly drawn. Hence, the term embraces also semi-drawn fiber filaments and those fibers that are once drawn and are then heat-set under relaxation to exhibit elasticity.

Examples of the dicarboxylic acid component other than terephthalic acid include isophthalic acid, phthalic acid, adipic acid and sebacic acid and examples of the diol component other than 1,4-butanediol include ethylene glycol, trimethylene glycol, pentamethylene glycol and the like. Examples of the poly(alkylene oxide) glycol include polyethylene glycol, poly(tetramethylene oxide) glycol, poly(1,2-propylene oxide)glycol and poly(1,3-propylene oxide)glycol. Of them, especially preferred is poly(tetramethylene oxide)glycol.

In the elastic non-woven web of the present invention, the fibers consisting of the abovementioned polyether ester type copolymer are sufficiently independent of, and separate from, one another; that is, they are deposited while sufficiently open, thereby to form thin webs, and the resulting thin webs are layered like scales to form the non-woven web. In other words, in order to obtain a non-woven fabric which is soft and excellent in the stretch recovery ratio, not only the fibers forming the non-woven fabric must be sufficiently independent and separate but thin layers consisting of the fibers must also be laminated and layered like scales. According to this scale-like layered structure, the non-woven fabric is capable of sufficiently following up an external force and undergoes deformation to give an arbitrary shape.

Since, in the elastic non-woven web in accordance with the present invention, the contact points of the constituent fibers are joined together by the fibers themselves, the web can be put to use without resort to a third component such as a binder. Thus, the elastic non-woven web is devoid of such problems as the lack of elasticity, softness and air permeability resulting from the use of a binder.

Since the elastic non-woven web in accordance with the present invention has elasticity as compared with the non-woven web consisting of polybutylene terephthalate, it does not lose its drapability even when the average size ranges from 15 d to 20 d, and has sufficient practicableness. However, the preferred average size of the fiber is up to 15 d and the fineness is preferably not uniform but distributed within the range of about 0.01 to about 20 d.

Besides the aforementioned requirements of the fiber material, area shrinkage in boiling water, stretch recovery ratio and fineness requirements, the elastic non-woven web in accordance with the present invention preferably has an apparent density of 0.1 g/cm$^3$ so that it has a thermal insulation value of at least 1.5 clo/cm and preferably at least 1.8 clo/cm. If these requirements are satisfied, there can be obtained a soft heat retaining web that is excellent in both heat retaining properties and elastic recovery ratio.

The elastic non-woven web may be composed of mixed fibers having mutually different average fineness and mutually different fineness distributions within the range of the abovementioned fineness requirements.

The elastic non-woven web of the present invention can be produced by the melt blow method in the same way as shown in FIG. 1. If necessary, however, the non-woven webs layered like scales on the conveyor may be fed to a press roll, are then subjected to predetermined press between a pair of hot rolls for integration in order to further strengthen adhesion between the fibers and thus to further improve the stretch recovery ratio when stretched by 20%.

The shape of the elastic non-woven web of the present invention thus integrated by the press treatment is substantially the same as those shown in FIGS. 2 and 3 except that it is more compact structurally.

Since the heat retaining sheet of the present invention has the construction described above, it provides the following excellent features:

(1) peculiar soft feel and tenacity,
(2) thin but having a high heat retaining properties,
(3) free from crease and does not deform,
(4) washable by dry cleaning and laundering,
(5) devoid of inflammability,
(6) highly soft and flexible, and
(7) easily sewn.

Because of these outstanding features, the heat retaining sheet of the present invention can be applied to a wide range of applications where a thin but highly heat retaining sheet is required or where a light-weight heat retaining sheet is required, such as listed below:

(1) batting for clothing (for jackets, ski wear, golf wear, fishing wear, vests, suits, women's wear, skirts, trousers),
(2) hats,
(3) gloves,
(4) shoes and boots,
(5) cushions and bedclothes,
(6) heat retaining materials for tubes and pipes,
(7) car ceiling and side wall heat retaining materials,
(8) airplane heat retaining materials,
(9) supporters and bandages, and
(10) interlinings.

Hereinafter, the present invention will be described in further detail with reference to Examples thereof.

In the Examples, the thermal insulation value and the thickness were measured in accordance with the following methods.

THERMAL INSULATION VALUE

The heat retaining force of 1 clo means a heat retaining force of clothes that permits a subject, who reposes in a room, held at 21° C. and up to 50% humidity with an air stream of 10 cm/sec, to keep the average skin temperature 33° C. in a comfortable way. It was assumed here that the subject emitted the heat of 50 kcal/m²·hour, 75% of which was discharged through his clothes. 1 clo was mathematically defined as follows:

$$1 \text{ clo} = 0.18° \text{ C.·hour·m}^2/\text{kcal}$$

The measurement was carried out in accordance with ASTM: D-1518-57T.

THICKNESS

The thickness of the non-woven web was measured using a measuring area of 2 cm² at a 5 g/cm² load.

Hereinafter, the present invention will be described in further detail with reference to Examples thereof, in which "part or parts" represents "part or parts by weight".

EXAMPLE 1

A microfiber non-woven web consisting of polybutylene terephthalate was prepared by the melt blow production method.

The non-woven web had an average fineness of 0.2d, an apparent density of 0.05 g/cm³, a thickness of 4 mm and a weight per unit area of 200 g/m². In the web, the fibers were mutually heat-adhered.

The web had a web unevenness value (CV value) of 20%, area shrinkage in boiling water of 7% and a thermal insulation value of 4 clo/cm.

This non-woven web was bonded to a woven fabric by a low-melting powder and was applied to the surface cloth of the back of a vest. The composite material had a thermal insulation value of 5.5 clo/cm. As a result, the vest fit the body well, was devoid of the feel of batting, exhibited excellent heat retaining properties and could be used effectively as a heat retaining material.

Though used for an extended period, the vest withstood repetitive washing and no decrease in the heat retaining properties were observed.

EXAMPLE 2

A non-woven web of microfibers consisting of polybutylene terephthalate was prepared by the melt blow production method in such a manner that adhesion between the fibers was increased by shortening the collecting distance between inlet and conveyor. The non-woven web had an average fineness of 0.1d, a thickness of 2.5 mm, a weight per unit area of 120 g/m² and an apparent density of 0.048 g/cm³. The web unevenness (CV value) was 12%, the area shrinkage in boiling water was 8% and the thermal insulation value was 3.5 clo/cm.

This non-woven web was bonded to a thin fabric to form a composite material for the surface cloth of the back of a sack suit. As a result, the heat retaining properties of the suit were improved without deteriorating its appearance.

Though used for an extended period, the suit withstood repetitive washing and maintained the heat retaining properties. The thermal insulation value of the composite material was 4.6 clo/cm.

EXAMPLE 3

A non-woven web consisting of polybutylene terephthalate was prepared by the melt blow production method.

The non-woven web had an average fineness of 0.2d, a thickness of 7 mm, a weight per unit area of 200 g/m² and an apparent density of 0.029 g/cm³. In the non-woven web, the fibers were mutually heat-adhered.

The web unevenness (CV value) was 18%, the area shrinkage in boiling water was 10% and the thermal insulation value was 1.9 clo/cm.

This non-woven web was bonded to a woven fabric and was fitted to the waist of pants. The composite material had the thermal insulation value of 3.2 clo/cm. As a result, the pants fit well, were devoid of any change in appearance and exhibited excellent heat retaining properties.

The parts had good durability and no decrease in the heat retaining properties were observed over an extended period.

EXAMPLE 4

A non-woven web consisting of polybutylene terephthalate and having an average fineness of 0.2d was prepared by the melt blow production method. This web had a weight per unit area of 200 g/cm², a thickness of 6 mm, an apparent density of 0.033 g/cm³, area shrinkage in boiling water of 7.5% and a thermal insulation value of 3.2 clo/cm.

Short fiber polyester non-woven fabrics having a weight per unit area of 20 g/m² were laminated on both sides of this non-woven web and were then pressed, thereby providing a composite material. Though no binder was used in this composite material, it was formed integrally and its wash shrinkage ratio was 1.5%. The wash resistance could thus be improved markedly as compared with the wash shrinkage ratio of 10% when the non-woven fabrics were not laminated. Incidentally, the wash shrinkage ratio of the short fiber polyester non-woven fabrics was 1.0%.

EXAMPLE 5

A non-woven web was prepared by the melt blow production method using a copolymer obtained by copolymerizing polybutylene terephthalate with 3% by weight of isophthalic acid. This non-woven web has an average fineness of 0.2d, a thickness of 4 mm, a weight per unit area of 200 g/m$^2$, an apparent density of 0.05 g/cm$^3$, area shrinkage in boiling water of 8% and a thermal insulation value of 4.1 clo/cm.

EXAMPLE 6

A non-woven web consisting of mixed fibers (mixing ratio: 60% of fibers of an average fineness of 0.3 d and 40% of fibers of an average fineness of 8d) of polybutylene terephthalate having the average fineness of 0.3d and 8d was prepared by the melt blow production method. This non-woven web had a weight per unit area of 200 g/m$^2$, a thickness of 12 mm, an apparent density of 0.017 g/cm$^3$, area shrinkage in boiling water of 6% and a thermal insulation value of 1.3 clo/cm. Incidentally, the two sizes of fibers were obtained mainly by changing diameters of a spinning orifice.

Since this non-woven web incorporated polybutylene terephthalate fibers having a greater average fineness (8d) in comparison with the non-woven web consisting of polybutylene terephthalate of an average fineness of 0.3d alone, it was excellent in recovery of compressive elasticity and could retain the initial thickness even after used for an extended period. In addition, decrease in heat retaining properties did not occur.

EXAMPLE 7

In preparing a non-woven web consisting of polybutylene terephthalate and having an average fineness of 0.3d by the melt below production method, about 2% by weight, based on the web weight, of an atomized adhesive consisting of an acrylic resin was sprayed onto the web to obtain a non-woven web having enhanced adhesion between the fibers.

The resulting web had a weight per unit of 160 g/m$^2$, a thickness of 10 mm, an apparent density of 0.016 g/cm$^3$, area shrinkage in boiling water of 3% and excellent dimensional stability. Even when washed, the web exhibited very little shrinkage.

EXAMPLE 8

A polyether ester copolymer obtained by polymerizing 28 parts of dimethyl terephthalate, 12 parts of dimethyl phthalate, 33 parts of poly(tetramethylene oxide)glycol having a number-average molecular weight of about 1,000 and 27 parts of 1,4-butanediol was employed to prepare fibers in the same way as in Example 1. The resulting fibers having an average fineness of 8d (0.3 to 13d) were collected on a conveyor to obtain an elastic non-woven web.

This non-woven web had a weight per unit area of 200 g/m$^2$ and an apparent density of 0.05 g/cm$^3$. The constituent fibers were self-bonded at the points of contact of the fibers.

The non-woven web had area shrinkage in boiling water of 8% and a recovery ratio of 71% when stretched by 20%. The thermal insulation value of the web was 3.8 clo/cm.

When the web of the present invention was used as batting in ski pants, it had heat retaining properties comparable to that of ordinary batting and was soft and excellent in elastic recovery. In addition, the pants wore well at the knees.

EXAMPLE 9

A polyether ester copolymer obtained by polymerizing 35 parts of dimethyl terephthalate, 15 parts of dimethyl isophthalate, 15 parts of poly(tetramethylene oxide)glycol having a number-average molecular weight of about 1,000 and 35 parts of 1,4-butanediol was employed to produce fibers by the melt blow production method. The resulting fibers were collected on a conveyor to obtain an elastic non-woven web. In this case, the distance between the inlet and the conveyor was set to 30 cm to collect the fibers.

The average fineness of the elastic fibers forming the non-woven web was 10d (0.5–15d) and the points of contact between the fibers were joined by self-adhesion of the fibers themselves. The non-woven web has a weight per unit area of 50 g/m$^2$, a recovery ratio of 82% when stretched by 20% and area shrinkage in boiling water was 7.5%.

The non-woven web was passed through a hot roll heated to 170° C. to further strengthen mutual adhesion of the fibers. As a result, the recovery ratio when stretched by 20% could be improved to 90%.

EXAMPLE 10

A polymer obtained by adding 5 parts of polybutylene terephthalate as a nucleating agent to 100 parts of the copolymer used in Example 9 was employed to produce fibers by the melt below production method. There was thus obtained a non-woven web consisting of the fibers having an average fineness of 12d.

This web had a weight per unit area of 50 g/m$^2$, area shrinkage by boiling water of 7.5% and a stretch recovery ratio of 85% when stretched by 20%.

Needle-punched non-woven fabrics were laminated to this web and were heat-adhered. The resulting non-woven web had a small drop in the stretch recovery ratio due to the lamination of the needle-punched non-woven fabrics and was rich in elastic recovery and softness.

What is claimed is:

1. A heat retaining sheet comprising a web formed by mutually bonding fibers containing polybutylene terephthalate, said fibers having a definite fiber length, being substantially undrawn and substantially uncrimped and having an average fineness of up to about 15 denier and a fineness distribution ranging from 0.001 to 40 denier, said web having area shrinkage in boiling weter of up to about 20%.

2. The heat retaining sheet as defined in claim 1 wherein said fibers consist essentially of polybutylene terephthalate.

3. The heat retaining sheet as defined in claim 1 wherein said fibers consist essentially of copolymeric polybutylene terephthalate.

4. The heat retaining sheet as defined in claim 1 wherein said web has an apparent density of up to about 0.1 g/cm$^3$.

5. The heat retaining sheet as defined in claim 1 wherein said webs have a thermal insulation value of at least 1.8 clo/cm.

6. The heat retaining sheet as defined in claim 1 wherein said fibers having a definite fiber length have an average fineness of up to about 0.5 deniers.

7. The heat retaining sheet as defined in claim 1, comprising at least a web in which fibers having an average size of up to about 0.5 deniers are mutually bonded and which has area shrinkage by boiling water of up to about 20% and an apparent density of up to about 0.1 g/cm$^3$, said heat retaining sheet having a thermal insulation value of at least 1.8 clo/cm.

8. The heat retaining sheet as defined in claim 6 wherein said fibers having a definite fiber length have an average fineness of 0.03 to 0.5 deniers and a fineness distribution of 0.01 to 1 denier.

9. The heat retaining sheet as defined in claim 1 wherein said fibers having a definite fiber length have mutually different average fineness and fineness distributions.

10. The heat retaining sheet as defined in claim 4 wherein said web has an apparent density of 0.01 to 0.1 g/cm$^3$.

11. The heat retaining sheet as defined in claim 1 wherein at least one another web is layered on, and integrated with, one or both surfaces of said web.

12. The heat retaining sheet as defined in claim 11 wherein said layered web is other non-woven fabrics.

13. The heat retaining sheet as defined in claim 11 wherein said layered web is woven fabric.

14. The heat retaining sheet as defined in claim 11 wherein said layered web is flame-retarding web.

15. The heat retaining sheet as defined in claim 1 wherein said web is 0.5 to 30 mm thick.

16. The heat retaining sheet as defined in claim 11 wherein said other web is 0.05 to 1 mm thick.

17. The heat retaining sheet as defined in claim 3 wherein said copolymer component is at least one member selected from the group consisting of isophthalic acid, adipic acid, sebacic acid and phthalic acid.

18. The heat retaining sheet as defined in claim 1 wherein said fibers having a definite fiber length are an elastomer consisting of a polyether ester type copolymer having butylene terephthalate as the hard segment.

19. The heat retaining sheet as defined in claim 18 wherein said fibers having a definite fiber length are an elastomer consisting of terephthalic acid, 1,4-butanediol, a dicarboxylic acid other than terephthalic acid and/or a low-molecular diol other than 1,4-butanediol and poly(alkylene oxide)glycol having a number-average molecular weight of about 300 to 6,000.

20. The heat retaining sheet as defined in claim 19 wherein said dicarboxylic acid other than terephthalic acid is one member selected from the group consisting of isophthalic acid, phthalic acid, adipic acid and sebacic acid.

21. The heat retaining sheet as defined in claim 19 wherein said diol other than 1,4-butanediol is one member selected from the group consisting of ethylene glycol, trimethylene glycol and pentamethylene glycol.

22. The heat retaining sheet as defined in claim 21 wherein said poly(alkylene oxide)glycol is one member selected from the group consisting of polyethylene glycol, poly(tetramethylene oxide)glycol, poly(1,2-propylene oxide)glycol and poly(1,3-propylene oxide)glycol.

23. The heat retaining sheet as defined in claim 18 wherein said fibers having a definite fiber length have an average fineness of up to about 20 deniers.

24. The heat retaining sheet as defined in claim 23 wherein said fibers having a definite fiber length have an average fineness of up to 15 deniers and a fineness distribution of 0.01 to 20 deniers.

25. The heat retaining sheet as defined in claim 24 wherein said fibers having a definite fiber length have mutually different average fineness and mutually different fineness distributions.

26. The heat retaining sheet as defined in claim 18 wherein said web has a strength recovery ratio of at least 50% when stretched by 20%.

27. The heat retaining sheet as defined in claim 26 wherein said web has an apparent density of up to about 0.1 g/cm$^3$.

28. The heat retaining sheet as defined in claim 27 wherein said web has a thermal insulation value of at least 1.5 clo/cm.

29. An elastic heat retaining sheet comprising a non-woven web formed from thin fiber layers laminated together, wherein said thin fiber layers comprise mutually bonded elastic fibers layered sufficiently independent and separate with respect to one another, wherein said elastic fibers consist essentially of an elastomer of a polyether ester type copolymer containing butylene terephthalate as the hard segment and have an average fineness up to about 15 denier and a fineness distribution of 0.01 to 20 denier and wherein said elastic heat retaining sheet has a stretch recovery ratio of at least 50% when stretched 20%.

30. The elastic heat retaining web as defined in claim 29 wherein an apparent density is up to 0.1 g/cm$^3$ and a thermal insulation value is at least 1.5 clo/cm.

31. A heat retaining sheet as defined in claim 7 wherein said fibers having a definite fiber length have an average fineness of 0.03 to 0.5 denier and a fineness distribution of 0.01 to 1 denier.

32. The heat retaining sheet as defined in claim 7 wherein said web has an apparent density of 0.01 to 0.1 g/cm$^3$.

* * * * *

UNITED STATES PATENT AND TRADEMARK OFFICE
CERTIFICATE OF CORRECTION

PATENT NO. : 4,438,172

DATED : March 20, 1984

INVENTOR(S) : Katsutoshi Ando et al

It is certified that error appears in the above-identified patent and that said Letters Patent is hereby corrected as shown below:

Column 9, line 45, after "unit" insert -- area --.

Column 10, line 22, "has" should read -- had --.

Column 10, line 35, "below" should read -- blow --.

Signed and Sealed this

Ninth Day of April 1985

[SEAL]

Attest:

DONALD J. QUIGG

Attesting Officer     Acting Commissioner of Patents and Trademarks